United States Patent
Suzuki et al.

(10) Patent No.: US 6,309,278 B1
(45) Date of Patent: Oct. 30, 2001

(54) METHOD AND APPARATUS FOR POLISHING OPTICAL CONNECTOR END FACES

(75) Inventors: Kenji Suzuki, Chiba; Jie Xu, Ichihara; Shinichiro Iizuka, Ichihara; Etsuo Tanabe, Ichihara; Masato Shiino, Ichihara, all of (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 08/957,208

(22) Filed: Oct. 24, 1997

(30) Foreign Application Priority Data

Feb. 27, 1996 (JP) .................................................. 8-065330

(51) Int. Cl.[7] .................................................. B24B 1/00
(52) U.S. Cl. .............................. 451/41; 451/59; 451/296
(58) Field of Search ................................. 451/168, 169, 451/59, 41, 296, 57

(56) References Cited

U.S. PATENT DOCUMENTS

| 5,007,209 | * | 4/1991 | Saito et al. ............................. | 51/283 |
| 5,447,464 | * | 9/1995 | Franklin et al. ....................... | 451/28 |
| 5,727,989 | * | 3/1998 | Ohno et al. ............................ | 451/41 |
| 5,768,738 | * | 6/1998 | Lee ....................................... | 15/210.1 |

FOREIGN PATENT DOCUMENTS

| 48-40891 | 5/1973 | (JP) . |
| 55-115009 | 9/1980 | (JP) . |
| 58-68707 | 4/1983 | (JP) . |
| 59-109452 | 7/1984 | (JP) . |
| 59-192448 | 10/1984 | (JP) . |
| 2-123205 | 5/1990 | (JP) . |
| 2-131854 | 5/1990 | (JP) . |
| 4-343665 | 11/1992 | (JP) . |
| 7-75953 | 3/1995 | (JP) . |
| 9-29599 | 2/1997 | (JP) . |
| 9-201758 | 8/1997 | (JP) . |
| 4092017A | * | 8/1998 | (JP) . |

* cited by examiner

*Primary Examiner*—Timothy V. Eley
*Assistant Examiner*—Dung Van Nguyen
(74) *Attorney, Agent, or Firm*—Lacasse & Associates

(57) ABSTRACT

The invention relates to a method for polishing optical connector end faces and a small-sized, light and easily transportable machine for doing the same, which are able to polish optical fiber end faces to desired shapes. A tape support member (18) is disposed at the connection end face (3) side of a multiple-core optical connector (4) attached on a machine, The tape support member(18) is linked to a supporting rod (21) which is able to freely advance and retreat along side plates (23a) and (23b), a tape travelling plane (9) shaped so as to correspond to a desired end face shape of bare optical fibers of a multiple-core optical connector (4) is formed at the tip end of the tape support member (18). The leading end of a polishing tape (32) wound on the pay-out roller (30) is advanced along the tape travelling plane (9) and is taken up on the winding roller (31). The polishing tape (32) is caused to travel by rotating the winding roller (31) together with the winding shaft (28), and the end faces of multiple-core bare optical fibers protruding forwards from the connection end face (3) of the multiple-core optical connector (4) are pressed to the polishing tape travelling along the tape travelling plane (9). As the tape is advanced, the pressing force of a biasing spring (26) presses the fiber end faces against the polishing tape and the tape support member and thereby polishes the fiber end faces to the desired face shape.

21 Claims, 8 Drawing Sheets

Polishing abrasive face

METHOD AND APPARATUS FOR POLISHING OPTICAL CONNECTOR END FACES

This application is a continuation of PCT International Application No. PCT/JP97/00516 filed Feb. 24, 1997.

FIELD OF THE INVENTION

The present invention relates to a method for polishing optical connector end faces, which is able to polish the end face of an optical connector protruding from the connection end face of optical connectors by using a polishing tape, and a small-sized and easily transportable machine for achieving the method.

BACKGROUND OF THE INVENTION

Figure 10:
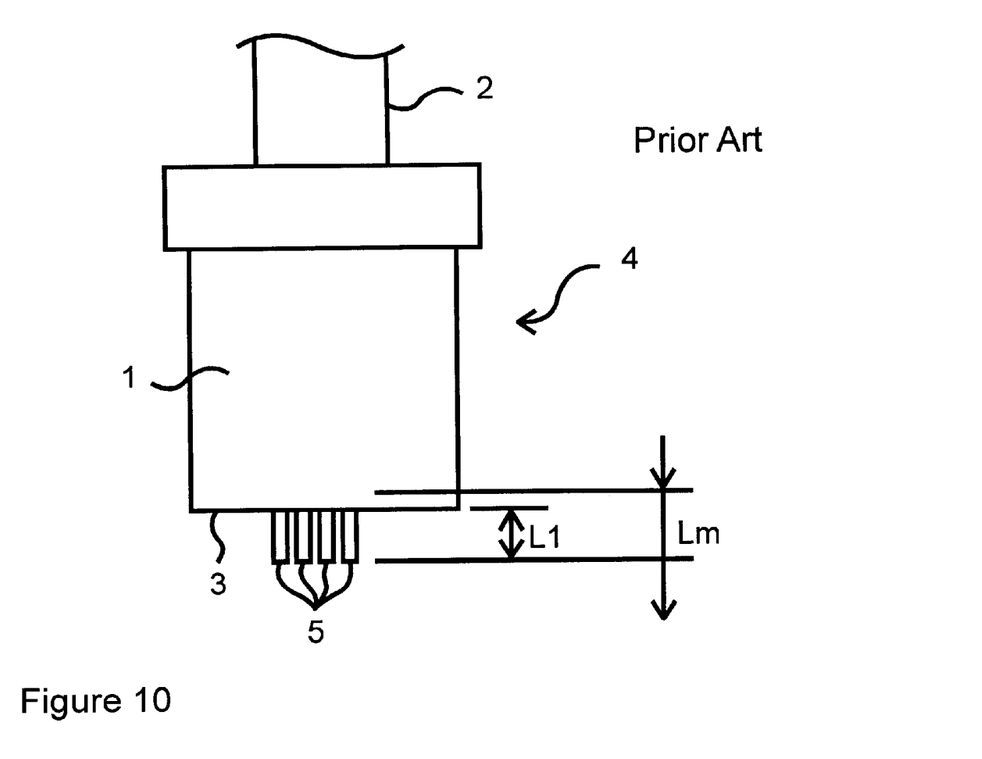
FIG. 10 is an explanatory view of the prior art showing a general multiple-core optical connector.

A method for detachably connecting optical fibers by using a single-core optical connector or a multiple-core optical connector has been used as one of the methods for connecting optical fibers. FIG. 10 shows a generally known multiple-core optical connector, which is used for detachably connecting multiple-core optical fibers. As shown in the same drawing, a plurality of optical fiber insertion holes (not illustrated) are juxtaposed and formed inside a ferrule 1, bare optical fibers 5 at which the tip end side covering of an optical tape 2 is eliminated are inserted into these optical fiber insertion holes in such a state where they protrude therefrom, and the bare optical fibers 5 are fixed to the ferrule 1 by an adhesive agent, etc. thereby causing a multiple-core optical connector 4 to be composed.

Figure 11:
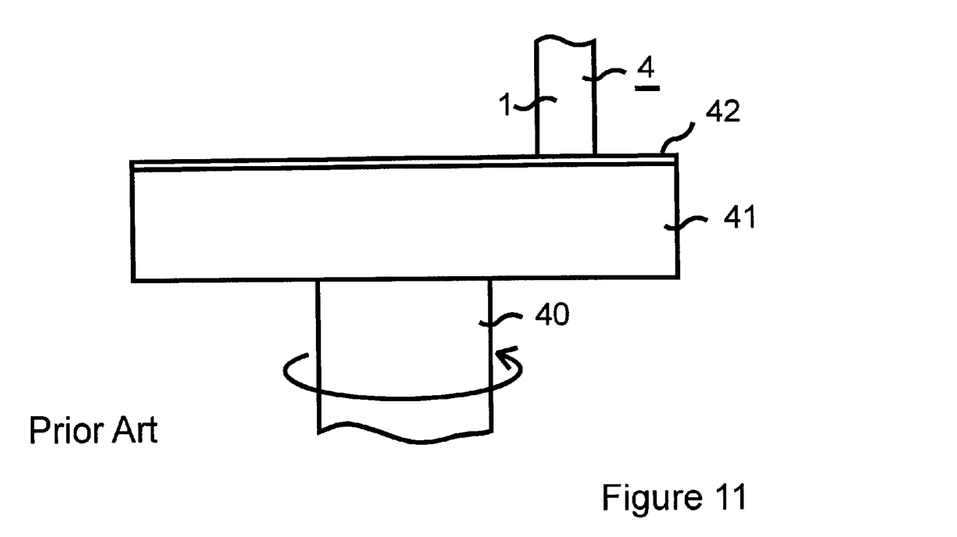
FIG. 11 is an explanatory view of the prior art showing one example of polishing methods of a conventional multiple-core optical connector.

The multiple-core optical connector 4 is set to, for example, a polishing machine shown in FIG. 11, in a state that the optical tape 2 is connected to the ferrule 1, wherein the connection end face 3 side of the ferrule 1 is pressed to the polishing surface 42 of a grinding wheel 41 on the turntable 40 which is rotating, the end face of the optical fiber 5 is polished along with the connection end face 3 of the ferrule 1, and the multiple-core connector 4 is polish-finished when the same is polished to the position Lm shown in FIG. 10.

However, for example, as shown in FIG. 11, since a conventional polishing machine has a grinding wheel 41 disposed on the turntable 40 and is large-sized, the machine is remarkably large and heavy in weight. Therefore, it is very cumbersome to convey the same to the site of connections of optical connectors such as multiple-core connectors 4, etc., and the same is an obstacle in view of improving the working efficiency of connections of optical connectors.

Furthermore, in a conventional method for polishing optical connector end faces, as described above, if a force for pressing an optical connector such as a multiple-core connector 4, etc. to a grinding wheel 41, etc. is weak, there arises such a problem, where the polishing efficiency is bad and it takes longer for polishing since the end face of an optical fiber 5 is polished to the position where the same is polished together with the connection end face of a ferrule 1. On the other hand, if the optical connector is strongly pressed to the grinding wheel 41 side in order to increase the polishing efficiency, there arises another problem that the tip end side of optical fiber 5 may be cracked causing the optical fiber end face side to be damaged. Furthermore, such problems also occurred in implementing an elastic polishing disk described in Japanese Patent Publication No. 192460 of 1986 in order to spherically polish the optical fiber end faces, using the polishing machine shown in FIG. 11.

Furthermore, since, in conventional polishing machines, a grinding wheel, polishing disk, etc. are very large with respect to optical connectors, there arises still another problem that since it is difficult to position optical connectors with respect to a polishing machine, only one side of the optical connector end face is polished if the parallelism of the grinding wheel surface or the surface of a grinding disk with the optical connector end face slightly slips.

The present invention was developed in order to solve the abovementioned problems, and it is therefore an object of the invention to provide a method for polishing the end face of optical connector, by which the optical fiber end faces of optical connector can be easily polished to an appointed shape of end face in a short time so as not to damage the optical fiber end face sides without using any turntable type polishing machine, and to provide a small-sized and easily transportable polishing machine adapted for the polishing method.

SUMMARY OF THE INVENTION

In order to achieve the above object, the present invention is provided with the following means. A method for polishing optical connector end faces according to the invention comprises the steps of: positioning an optical connector, in which an optical fiber protrudes from the connection end face thereof, in a polishing machine, arranging a polishing tape having flexibility at the side opposite the connection end face side of an optical connector and bringing the end face of the abovementioned optical fiber into engagement with a polishing abrasive surface of the abovementioned polishing tape, arranging a tape support member provided with a tape travelling plane of a shape corresponding to an appointed end face shape of the abovementioned optical fiber against an opposite surface of the polishing abrasive surface of the abovementioned polishing tape, and causing the abovementioned polishing tape to travel between the tape travelling plane of the abovementioned tape support member and the optical fiber end face.

Furthermore, a method for polishing optical connector end faces according to the invention is also characterized in that the abovementioned optical connector is a multiple-core optical connector in which a plurality of optical fibers are aligned in parallel substantially in a single plane, and a polishing tape is caused to travel orthogonally to the transverse direction of the aligned optical fibers of the abovementioned multiple-core optical connector. Furthermore, it is preferable that in order to prevent the optical fiber end faces from being damaged when being polished, the axial direction of optical fibers is formed to an adequate degree of angle exceeding 90° where it is assumed that the travelling direction of the polishing tape is 0°.

Furthermore, a polishing machine according to the invention comprises an optical connector attaching portion for attaching an optical connector in which optical fibers protrude from the connection end face, a tape support member provided with a tape travelling plane shaped so as to correspond with an appointed end face shape of the abovementioned optical fibers and positioned facing the connection end face of optical connectors to be attached to the optical connector attaching portion, a polishing tape which has an abrasive polishing surface thereon and travels along the tape travelling plane of the abovementioned tape support member with the polishing surface positioned against the optical fiber end face, a tape travelling drive means for carrying out a travelling drive of the abovementioned polishing tape, which is advanced from a pay-out shaft onto a winding shaft via the abovementioned tape travelling plane, and a polishing pressure applying means for giving polishing pressure for a polishing tape to the optical fiber end faces by pressing at least one of the tape travelling plane and the optical connector side, both of which are opposite each other, to the other thereof.

Furthermore, a polishing machine according to the invention is also characterized in that the tape travelling plane of the abovementioned tape support member has a wider plane than the optical fiber end face to be polished by a polishing tape travelling along the abovementioned tape travelling plane, the tape travelling plane of the abovementioned tape support member is formed to be concave, or the tape travelling plane of the abovementioned tape support member is formed to be convex.

Furthermore, a polishing machine according to the invention is also characterized in that the abovementioned polishing tape is constructed of a continuous tape in which a thicker fine-grained abrasive tape is linked to a coarse-grained abrasive tape at a terminal end thereof. A coarse-grained abrasive tape and a thicker fine-grained abrasive tape, in a further embodiment are separately and independently prepared as the abovementioned polishing tape, wherein the coarse-grained abrasive tape and fine-grained abrasive tape are mounted between the pay-out shaft and the winding shaft so as to be freely replaced. Preferably the abovementioned polishing tape is a cassette type polishing tape in which the same is mounted between a pay-out roller attached to the pay-out shaft and a winding roller attached to the winding shaft, and the pay-out roller and winding roller are incorporated in a cassette.

Furthermore, a polishing machine according to the invention is also characterized in that a polishing coolant supplying means is provided for supplying a polishing coolant to the area where the abovementioned optical fiber end faces are pressed to and is brought into contact with the polishing surface of the polishing tape and are polished thereat, the abovementioned connector is detachably attached to a collet chuck, and the collet chuck is detachably attached to the connector attaching portion.

In the invention constructed as described above, an optical fiber is attached to the optical connector attaching portion of a polishing machine, the polishing tape is caused to travel along the tape travelling plane of the tape support member, and the end face of a single-core or a multiple-core optical fiber protruding from the connection end face of the optical connector is pressed to the polishing surface of the polishing tape, whereby the optical fiber end face is polished by the polishing tape. Since the tape travelling plane of the abovementioned tape support member is formed to be shaped to an appointed end face shape of optical fibers, the respective optical fiber end faces are polished to the shape of the appointed end face.

Since the invention is constructed so that only the bare optical fibers protruding from the connection end face of the optical connector is polished, the power required for polishing may be made remarkably smaller than that of a conventional machine in which a turntable is rotated. Accordingly, by using a polishing tape, it is possible to easily polish the optical fiber end faces in a short time without damaging the end faces. Thereby, the construction of a polishing machine can be simplified, reduced in size and weight, whereby a construction of a micro polishing machine can be achieved, and it becomes easy to convey the same to the site of connection of optical connectors. Accordingly, the connection work efficiency of optical connectors can be remarkably improved. Still furthermore, it is possible to obtain any desired protrusion length of optical fibers, depending on the set time of finish-polishing.

Furthermore, according to the invention, the polishing machine is constructed so that the abrasive face of a polishing tape is brought into engagement with the end face of optical fibers of an optical connector, a tape support member provided with a travelling face shaped to an appointed end face shape is arranged on the opposite side of the abrasive face of the polishing tape, the polishing tape is caused to travel between the tape travelling plane of the tape support member and the optical fiber end face, in order to polish optical connector end faces. Therefore, it is possible to effectively polish the optical fiber end face to an appointed end face shape.

Furthermore, if an optical connector set in a polishing machine is a multiple-core optical connector, it is possible to thoroughly polish the end faces of a plurality of optical fibers juxtaposed in the multiple-core optical connector by the polishing machine. In particular, if the polishing work is carried out by causing the polishing tape to travel in a direction roughly orthogonal to the axial fiber direction of the multiple-core optical connector, it is made possible to easily adjust the parallelism between the connection end face of the multiple-core optical connector and the tape travelling plane, and it is also possible to further effectively make the end faces of a plurality of optical fibers uniform. Furthermore, in order to prevent the optical fiber end faces from being broken off or damaged when polishing the same, it is preferred that the axial direction of optical fibers is set to any adequate degree of angle exceeding 90° where it is assumed that the travelling direction of the polishing tape is 0°.

Furthermore, in a polishing machine according to the invention, in a case where the tape travelling plane of the abovementioned tape support member is made a flat plane which is wider than the optical fiber end face, it is possible to polish the optical fiber end faces of an optical connector to be substantially flat.

Furthermore, in a polishing machine according to the invention, in a case where the tape travelling plane of the abovementioned tape support member is made concave, it will be made possible to effectively finish the optical fiber end faces of an optical connector to be spherical or convex. Similarly, in a case where the tape travelling plane of the abovementioned tape support member is made convex, it will be made possible to effectively finish the optical fiber end faces of an optical connector to be concave.

Furthermore, with a polishing machine to the invention, since it is constructed that the abovementioned polishing tape is formed of a continuous tape in which a fine-grained abrasive tape which is thicker than a coarse-grained abrasive tape at the pay-out side thereof is linked to the coarse-grained abrasive tape, or that a coarse-grained abrasive tape and a fine-grained abrasive tape which is thicker than the coarse-grained abrasive tape are separately and independently prepared as a polishing tape in such a manner that the coarse-grained abrasive tape and fine-grained abrasive tape are replaceably mounted between the pay-out shaft and the winding shaft, it is possible to carry out a finishing polishing of the optical fiber end faces by a fine-grained abrasive tape after roughing them by a coarse-grained abrasive tape at the pay-out side. Therefore, the optical fiber end faces can be very efficiently polished by a polishing tape in a good state.

Furthermore, in a construction that a coarse-grained abrasive tape and a fine-grained abrasive tape which are separately and independently prepared are replaceably attached when the polishing tape is constructed so as to have a coarse-grained abrasive tape and a fine-grained abrasive tape as described above, for example, since various kinds of combinations of a coarse-grained abrasive tape and a fine-grained abrasive tape can be obtained in response to an optical connector set in the polishing machine, it is possible to form various combinations of grain sizes of the polishing tape as necessary. On the other hand, if the coarse-grained abrasive and fine-grained abrasive tape are linked to each other to make a continuous tape, it is possible to omit a cumbersome replacement work of the polishing tape, which is required whenever carrying out roughing and finishing.

Furthermore, in a polishing machine according to the invention, in a case where the abovementioned polishing tape is a cassette type polishing tape in which the same is mounted, wound between a pay-out roller attached to the pay-out shaft and a winding roller attached to the winding shaft, and the pay-out roller and winding roller are accommodated in a cassette, it is possible to very easily to attach and detach the polishing tape and to cause the polishing tape to travel smoothly. Therefore, the polishing machine can be made very compact and very efficient in view of working.

Furthermore, with a polishing machine according to the invention, which is provided with a polishing coolant supplying means for supplying a polishing coolant to the area where the optical fiber end faces are to be polished, a wet type polishing can be carried out while supplying a polishing coolant to the polishing area from the polishing coolant supplying means. The polishing coolant can cool down the polishing area and is able to cause the polishing waste, etc. to flow out, and it is possible to further smoothly polish the optical fiber end faces in a better state.

Still furthermore, with a polishing machine according to the invention, in which an optical connector is detachably attached to a collet chuck and the collet chuck is detachably mounted at the connector attaching portion, it is possible to easily attach optical connectors to and detach the same from the polishing machine.

BRIEF DESCRIPTION OF THE DRAWINGS

FIG. 1b is a bottom view of the preferred embodiment of FIG. 1a;

DETAILED DESCRIPTION OF PREFERRED EMBODIMENTS AND BEST MODE FOR CARRYING OUT THE INVENTION

Figure 1A:
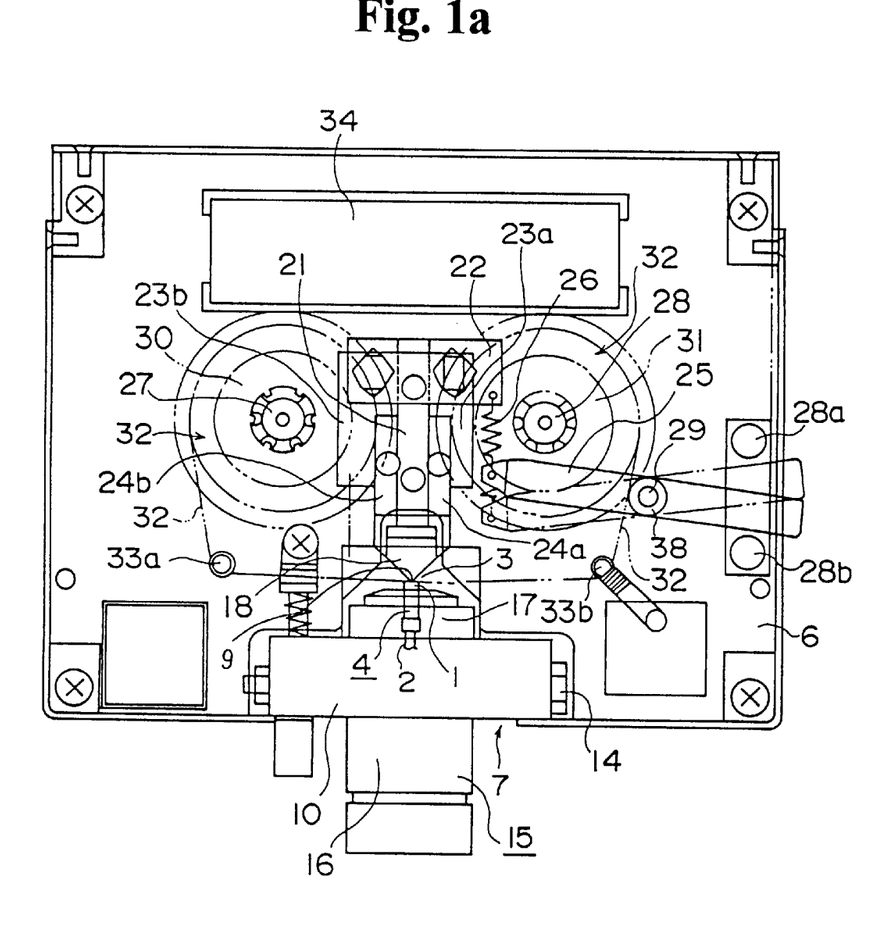
FIG. 1a is a frontview of a construction showing one preferred embodiment of a polishing machine according to the invention.
Figure 1B:
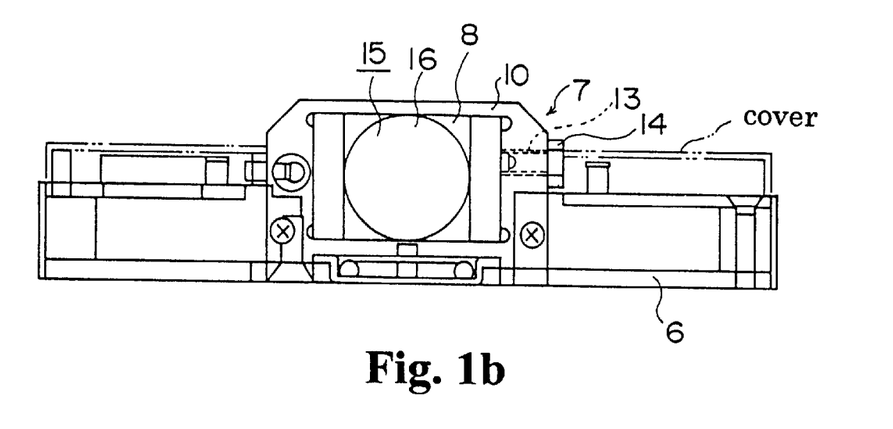
Figure 2:
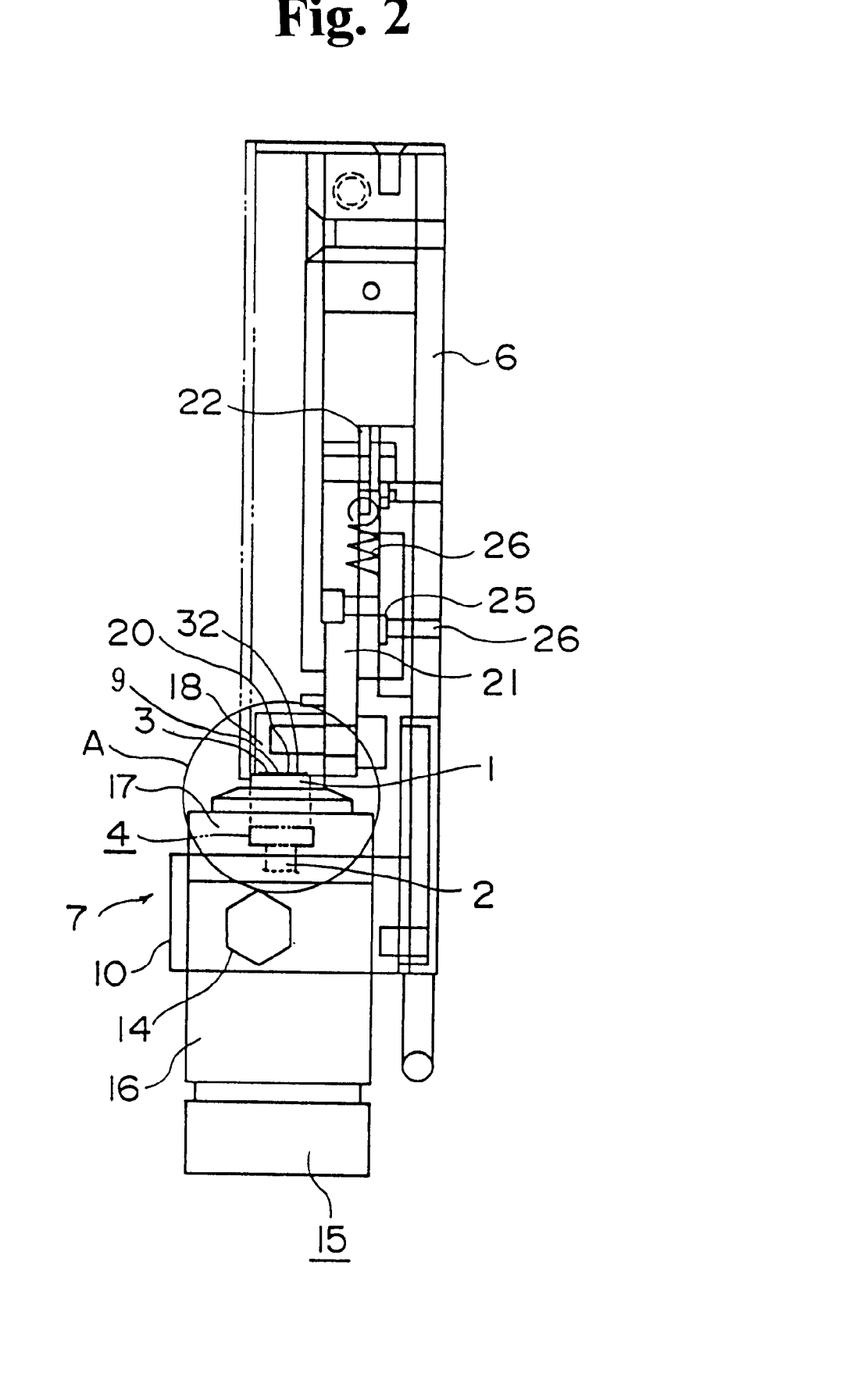
FIG. 2 is a side elevational view of a polishing machine according to the preferred embodiment.

Hereinafter, as description will be given of the invention with reference to the accompanying drawings. FIG. 1 and FIG. 2 show a preferred embodiment of a polishing machine for achieving a method for polishing optical connector end faces according to the invention. An optical connector polished by using the polishing machine is, for example, a multiple-core optical connector 4 which is similar to that shown in FIG. 10. Bare optical fibers 5 at the end portion of an optical fiber 2, the covering of which is removed, are inserted into optical fiber insertion holes of the ferrule 1, and the bare optical fibers 5 are caused to protrude from the connection end face 3 of the ferrule 1, wherein the bare optical fibers 5 at the multiple-core optical connector 4, which are to be polished by a polishing machine according to the preferred embodiment are fixed to the ferrule 1 by using an adhesive agent, etc., in such a state where they protrude only $L_1$ (several tens $\mu$m to 0.3 mm) from the connection end face 3 of the ferrule 1.

Usually, before the bare optical fibers 5 are inserted into the optical fiber insertion holes of the ferrule 1, their tip ends are cut off by a cutting means and are trued to be flush. Actually however, in a microscopic view, they are not trued up in the order of $\mu$m, and the polishing is carried out in order to correct this disorder and to cause the tip end faces (connection end faces) of the bare optical fibers to be mirror-finished.

In FIG. 1 and FIG. 2, an optical connector attaching portion (multiple-core optical connector attaching portion) 7 is provided on the surface of a base 6 in the polishing machine. At the multiple-core attaching portion 7, a shank portion (axial portion) 16 of a collet chuck 15 is detachably put and fixed in an inner spacing 8 of a holding frame portion 10 having the abovementioned inner spacing 8, and the multiple-core optical connector 4 which is to be polished is detachably attached in the chuck portion 17 of the collet chuck 15 in a state that the connection end face 3 is faced toward the outside of the chuck 15.

Figure 5A:
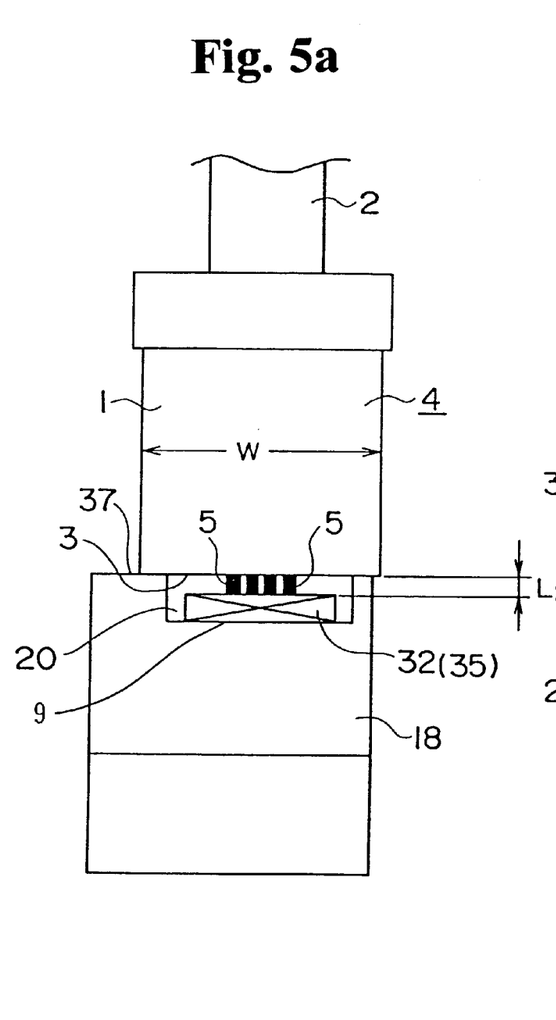
FIG. 5a is an explanatory view showing a polishing state consisting of a roughing state.
Figure 5B:
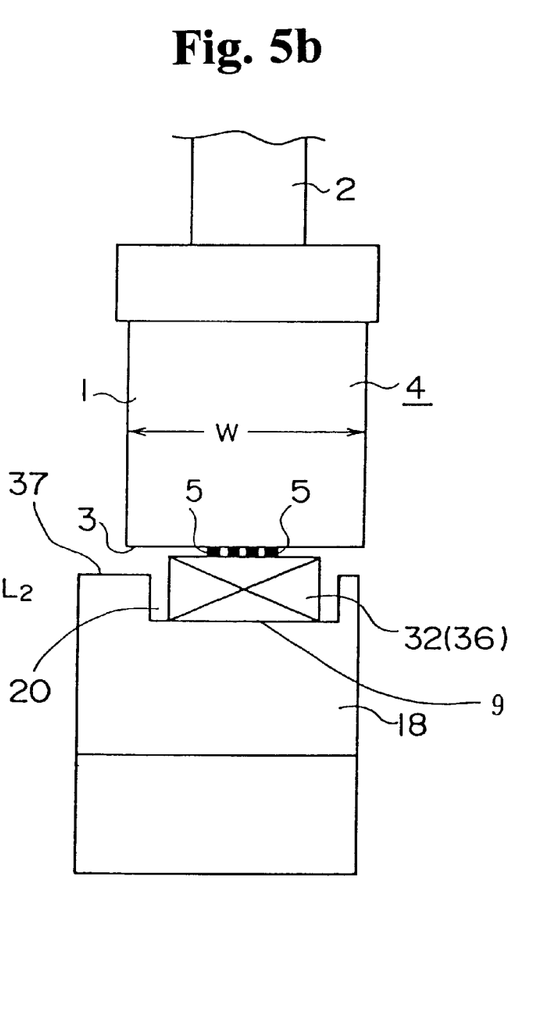
FIG. 5b is an explanatory view showing a finishing state of a multiple-core optical connector in the preferred embodiment.

A tape support member 18 is disposed facing the tip end face of the chuck portion 17 of the collet chuck 15. A concave tape travelling groove 20 is formed in the tape support member 18 at the position opposite to the connection end face 3 of the multiple-core optical connector 4 attached in the chuck portion 17 of the collet chuck 15. The width of the tape travelling groove 20 is, as shown in FIG. 5, made larger than the width of the bare optical fibers 5 of the multiple-core optical connector 4, and made smaller than the width W of the connection end face 3 of the ferrule 1. The groove depth is equivalent to the sum of an appointed fiber protrusion length $L_2$ for roughing and the thickness of a roughing tape as shown in FIG. 5(a) (This groove depth is not particularly limited).

Figure 3A:
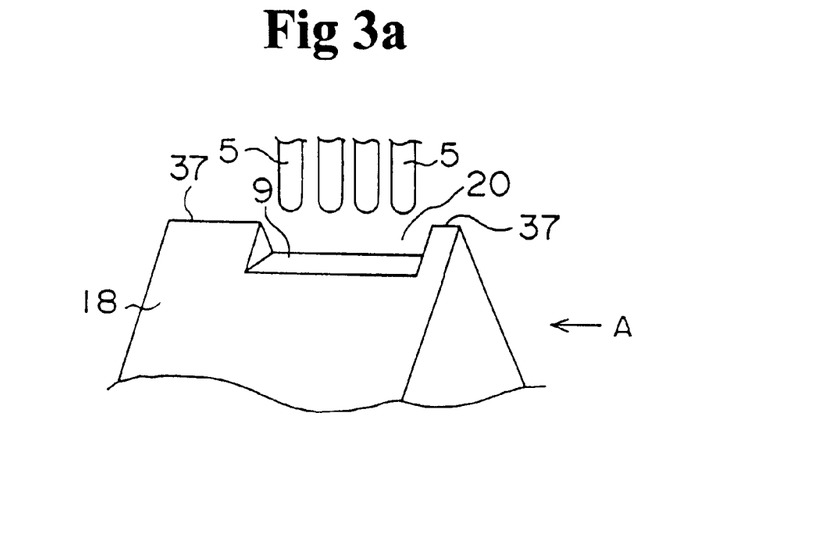
FIG. 3a is an isometric view showing the forming state of the tape travelling plane of a tape backup member in a polishing machine according to the preferred embodiment.
Figure 3B:
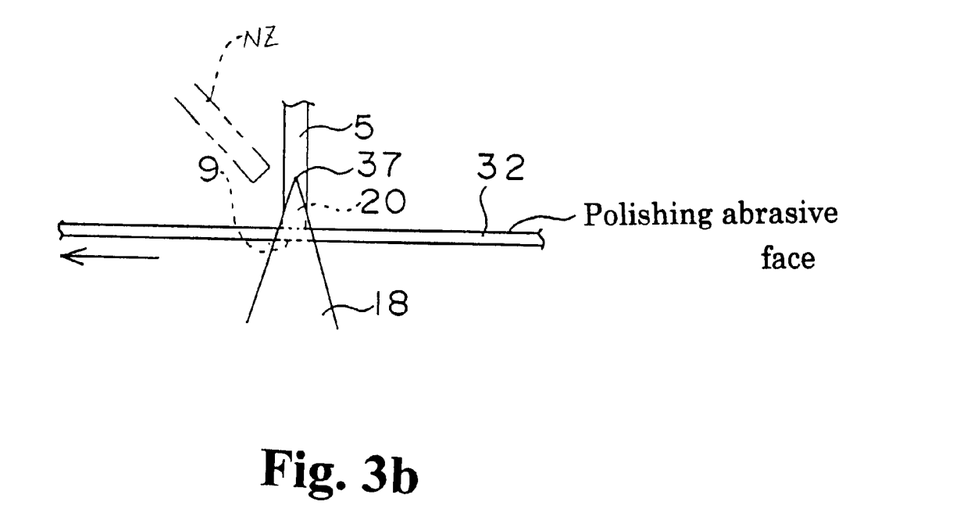
FIG. 3b is a side view, observed from the direction A in FIG. 3(a), showing the travelling of a polishing tape travelling along the tape travelling plane.

As shown in FIGS. 3(a) and (b), at the tape support member 18, a tape travelling plane 9 is formed on the bottom face of the tape travelling groove 20. The tape travelling plane 9 is formed to an appointed end face shape of the bare optical fibers 5, and in the preferred embodiment, the width of the tape travelling plane 9 forms a wider flat plane than the end face of the bare optical fibers 5 to be polished by a polishing tape 32 travelling along the tape travelling plane 9. Furthermore, the polishing tape 32 is a tape having flexibility, and as shown in FIG. 3(b), the polishing abrasive surface of the polishing tape 32 faces the bare optical fibers 5, and the tape support member 18 is positioned below the surface of the tape 32 opposite the abrasive surface. Since the polishing abrasive surface of the polishing tape 32 is brought into contact with the end face of the bare optical fibers 5, the end faces of the bare optical fibers 5 are able to be polished.

Figure 4A:
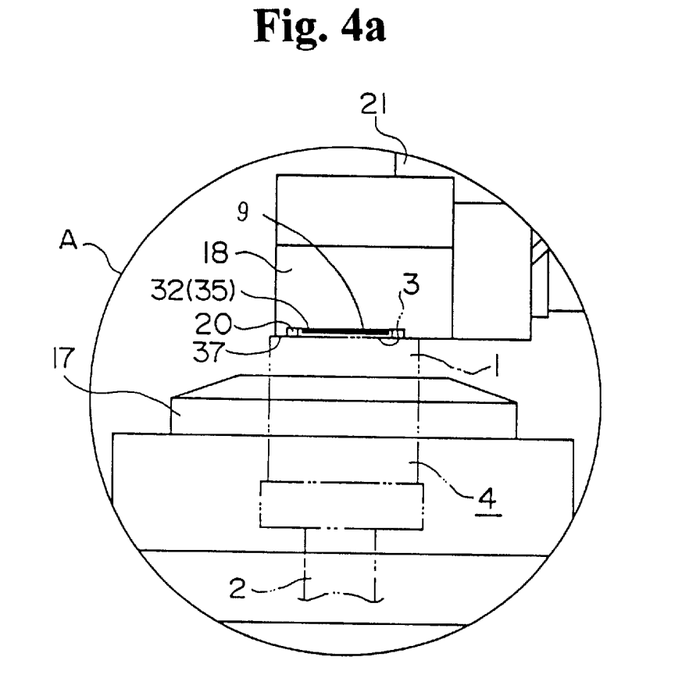
FIG. 4a is an enlarged view of part A in FIG. 2, showing a state where a coarse-grained abrasive tape for roughing is used as a polishing tape.
Figure 4B:
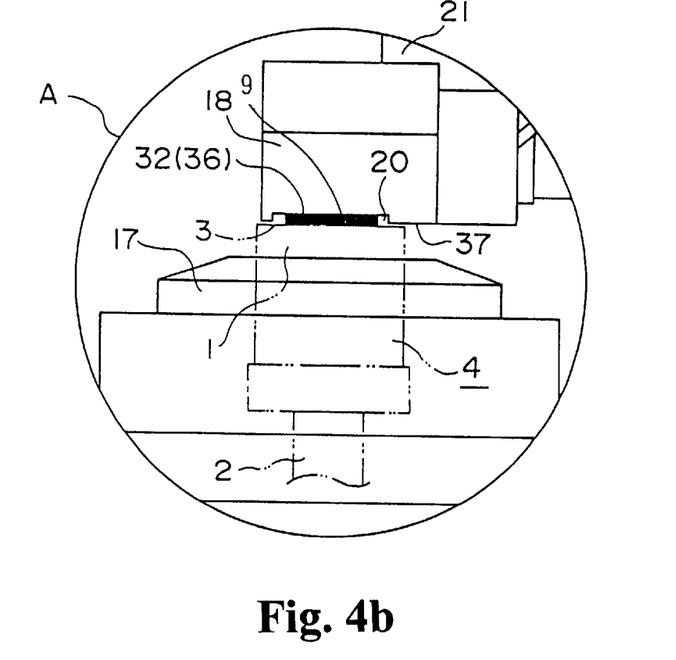
FIG. 4(b) is an enlarged view of part A in FIG. 2, showing a state where a fine-grained abrasive tape for finishing is used as a polishing tape.

FIG. 4 shows the details of the part where the abovementioned tape travelling groove 20 faces the multiple-core optical connector 4. FIG. 4 is an enlarged view of the part A in FIG. 2, wherein FIG. 4(a) shows a polishing state of roughing and FIG. 4(b) shows a state of finishing.

As shown in FIG. 1, FIG. 2 and FIG. 4, the tip end side of a plate-bar shaped supporting rod 21 is linked to the rear end side of the abovementioned tape support member 18 and a linkage plate 22 is attached to the rear end side of the supporting rod 21. Side plates 23a and 23b are provided at both the sides of the linkage plate 22 in a pattern where the side plates are positioned along the supporting rod 21 with a spacing remained. On the other hand, a pair of guide plates 24a and 24b are installed on the base 6, extending in the axial direction of the supporting rod 21. The supporting rod 21 is attached to the guide plates 24a and 24b slidably in the axial length direction with the guide plate 24a put between the supporting rod 21 and the side plate 23a and the guide plate 24b put between the supporting rod 21 and the side plate 23b, whereby the guide plates 24a and 24b function to guide the sliding of the supporting rod 21 in the axial direction.

A rod-like lever 25 is pivotally supported by a fulcrum shaft 29 so as to be moveable relative to an end of the side plate 23a. The upper end side of the fulcrum shaft 29 is threaded to be a male screw, and a nut 38 is screwed to the male screw. By tightening the nut 38, the pivotal position of the lever 25 can be fixed at the tightened position thereof. A pair of stop pins 28a and 28b protrude upward on the base 6 at the rear end of the lever 25 so that the lever 25 is positioned therebetween with a spacing maintained. These stop pins 28a and 28b function as stops so as to regulate excessive pivoting movement of the lever 25.

A biasing spring 26 intervenes between the end of the lever 25 and the abovementioned linkage plate 22, wherein by rotating the lever 25 counterclockwise, the interval between the end of the lever 25 and the linkage plate 22 is widened, and since the biasing spring 26 is elongated equivalent to the widened interval, the pressing force of the biasing spring 26, that is, a force by which the tape support member 18 side is pressed toward the multiple-core optical connector 4 is intensified. Contrarily, the pressing force of the biasing spring 26 is weakened by rotating the lever 25 clockwise. Thus, it is possible to adjust the force by which the tape support member 18 is pressed toward the multiple-core optical connector 4, by adjusting the rotational position of the lever 25. The lever 25 which rotates about fulcrum shaft 29, and the pressing spring 26 intervening between the lever 25 and the linkage plate 22 constitute a polishing pressure applying means.

A pay-out shaft 27 is provided at one side of the abovementioned supporting rod 21 on the upper side of the base 6, and the winding shaft 28 is provided at the other side. A pay-out roller 30 is detachably fitted to the pay-out shaft 27, and a winding roller 31 is detachably fitted to the winding shaft 28 as well. Convex and concave groove lines are formed on the inner circumferential surface of the fitting hole of the pay-out roller 30, and convex and concave groove lines are also formed on the outer circumferential surface of the pay-out shaft corresponding thereto, wherein the concave part at the pay-out shaft 27 side is fitted into the convex part of the pay-out roller 30 side to cause the pay-out roller 30 to rotate together with the pay-out shaft 27. Similarly, convex and concave groove lines are provided on the outer circumferential surface of the winding shaft 28 and on the inner circumferential surface of the fitting hole of the winding roller 31, corresponding to each other. One side concave part is fitted into the other side convex part, whereby the winding roller 31 is constructed so as to rotate along with the winding shaft 28.

A polishing tape 32 is wound on the abovementioned pay-out roller 30. Abrasives are adhered to and formed on the polishing surface side of the polishing tape 32. As described above, a polishing abrasive face is formed on the side contacting the connection end face 3 of a multiple-core optical connector 4. The leading end of the polishing tape 32 is taken out from the pay-out roller 30 via a guide roller 33a and is further caused to pass through the tape travelling groove 20 along the tape travelling plane 9 of the abovementioned tape support member 18. Thereafter, the same is connected to the winding surface of the winding roller 31 via a guide roller 33b.

In the abovementioned preferred embodiment, two kinds of abrasive tapes are prepared, one of which is a roughing coarse-grained tape having rough abrasives, and the other of which is a finishing fine-grained abrasive tape. The coarse-grained and fine-grained abrasive tapes are wound on the respective corresponding pay-out rollers 30, wherein the respective leading ends are linked to the respective corresponding winding rollers 31.

Although the travelling of the polishing tape 32 along the tape travelling plane 9 is carried out by rotating the winding roller 31, the rotation drive of the winding shaft 28 in the winding direction is executed by a tape travelling drive means which rotates the winding shaft 28 in the winding direction in engagement with the motor rotation. Furthermore, the tape travelling drive means is constructed so as to transmit the motor rotations to the winding shaft 28 via a reduction mechanism, etc. Since such a rotation transmission mechanism is already known, the illustration thereof is omitted in order to avoid the complication of the drawings. Furthermore, in a case where it is necessary to re-wind the polishing tape wound onto the winding roller 31 side back to the pay-out roller 30 side, a rotation mechanism for the pay-out shaft which rotates the pay-out shaft 27 in the reverse direction by utilizing the motor rotations will be added. The power source which drives the motor rotations of the tape travelling drive means is a battery 34, and a circuit for controlling the motor rotations is formed on the circuit board (not illustrated) which is placed at an adequate position of the base 6. Furthermore, the motor rotations can be driven by an external power source via an AC adapter.

In the preferred embodiment, the polishing surface of the polishing tape 32 passing through the tape travelling groove 20, that is, the polishing abrasive face is brought into contact with and is pressed to the tip end faces of the bare optical fibers 5 of a multiple-core optical connector 4 by utilizing the pressing force of the abovementioned biasing spring 26. In this state, by causing the polishing tape 32 to travel, the polishing tape 32 is put between the tape travelling plane 9 of the tape travelling groove 20 and the end faces of the bare optical fibers 5 and the polishing tape 32 is caused to travel along the tape travelling plane 9. This travelling causes the end faces of the bare optical fibers 5 to be polished by the polishing tape 32. Herein, although the polishing of the end faces of the bare optical fibers 5 may be a dry polishing, it is further preferable that a wet type polishing in which a polishing coolant is supplied to the polishing area is employed.

When employing a wet type polishing system, a polishing coolant jetting nozzle NZ which acts as a polishing coolant supplying means which jets a polishing coolant to the polishing area is provided, for example, in the vicinity of the polishing area shown in FIG. 3(b). Although water may be used as a polishing coolant, it is preferable that the polishing coolant is a water-alcohol solution obtained by mixing alcohol with water at a ratio of 20 to 30% in order to more effectively obtain a cooling action of the polishing area, a function for discharging polishing wastes resulting from polishing and a function for preventing the polishing coolant from being frozen. And a polishing coolant is supplied to the polishing tape portion by a capillary action with a felt-like member inserted into a tank of the polishing coolant.

In the preferred embodiment, although polishing is carried out by utilizing two kinds of polishing tapes consisting of a coarse-grained abrasive tape and a fine-grained abrasive tape, the tapes are different from each other in thickness, that is, the fine-grained abrasive tape is thicker than the coarse-grained tape.

FIG. 5(a) shows a roughed state where a coarse-grained abrasive tape 35 is used, and FIG. 5(b) shows a finished state in which a fine-grained abrasive tape 36 is used. As been made clear in these drawings, the thickness of the fine-grained abrasive tape 36 is formed to be larger than that of the coarse-grained abrasive tape 35. In this preferred embodiment, the abrasives used for the coarse-grained abrasive tape 35 and fine-grained abrasive tape 36 are made of aluminum oxide, wherein the grain size of abrasives of the coarse-grained tape 35 is 5 $\mu$m while the grain size of abrasives of fine-grained tape 36 is 0.5 $\mu$m. Furthermore, the thickness of the coarse-grained abrasive tape 35 is made 5 $\mu$m thinner than the groove depth of the tape travelling groove 20 (the groove depth of the tape travelling groove 20 is made 5 $\mu$m deeper than the thickness of the coarse-grained abrasive tape 35). The thickness of the fine-grained abrasive tape 36 is larger than that of the coarse-grained abrasive tape 35, and in the preferred embodiment, the fine-grained abrasive tape 36 is made slightly thicker than the groove depth dimension of the tape travelling groove 20.

A polishing machine of the preferred embodiment is constructed as described above. Next, a description will be given of a polishing action (polishing method) of a multiple-core optical connector 4. Firstly, as shown in FIG. 1, a multiple-core connector 4 which is a subject to be polished is placed in the collet chuck 15 and the collet chuck 15 is put in and fixed at the multiple-core connector attaching portion 7.

The pay-out roller 30 on which a polishing tape 35 is wound is attached to the pay-out shaft 27 and the winding roller 31 is attached onto the winding shaft 28. When attaching the polishing tape, the leading end of the coarse-grained abrasive tape 35 is passed through the guide roller 33a, the tape travelling groove 20 and guide roller 33b in the order and is wound onto the winding roller 31.

In this state, the tip end face of the bare optical fibers 5 protruding from the connection end face 3 of the multiple-core optical connector 4 is brought into contact with the polishing surface of the coarse-grained abrasive tape 35 to cause a polishing pressure to be given by the pressing force of the biasing spring 26. The rotation position of the lever 25 is adjusted to vary and adjust the pressing force of the biasing spring 26. Resultantly, the contacting pressure between the bare optical fiber end face and the polishing surface, that is, the polishing pressure is adjusted to the optimal state, wherein the rotation position of the lever 25 is locked at the adjusted position by tightening a nut 38.

When performing a polishing work, since an improperly polished layer occurs on the fiber end face if the polishing pressure is too strong, the polishing pressure must be adjusted to the optimum polishing pressure so that no improperly polished layer occurs. For example, in a case where the four-core optical connector in which the diameter of an bare optical fiber 5 is 125 $\mu$m is polished, it is most preferable to set the polishing pressure to about 40±10 gf (that is, 10±5 gf per core). In a case where the number of cores of a multiple-core connector and the diameters of the respective bare optical fibers are different, the polishing pressure best suitable for the specified multiple-core optical connector 4 according to its specification is obtained through experiments, whereby when polishing a optical connector, the rotation position of the lever 25 is adjusted so as to obtain the optimal polishing pressure.

After the multiple-core optical connector 4 is set and the polishing pressure is adjusted, the motor of the tape travelling drive means is driven and rotated, and the coarse-grained abrasive tape 35 is caused to travel through the tape travelling groove 20, wherein by the travelling thereof, the coarse-grained abrasive tape 35 is caused to travel in the direction orthogonal to the transverse direction of the aligned optical fibers of the multiple-core optical connector 4. At this time, in a case where a wet type polishing is carried out, a polishing coolant is jetted to and supplied to the polishing area. When starting polishing the tip end face of the bare optical fibers 5 of a multiple-core optical connector 4, since the protrusion length $L_1$ (See FIG. 10) of the bare optical fibers 5 is longer than the distance $L_2$ (See FIG. 5(a)

between the polishing surface of the coarse-grained abrasive tape 35 and the groove-formed surface 37 of the tape travelling groove 20, the end face polishing of the bare optical fibers 5 is commenced in such a state where the connection end face 3 of the multiple-core optical connector 4 has clearance with the groove-formed surface 37 of the tape travelling groove 20.

Since the end faces of the bare optical fibers 5 will be polished in line with the progress of polishing, the protrusion length of the bare optical fibers 5 from the connection end faces 3 becomes shorter and shorter. As shown in FIG. 5(a), the progress of polishing of the bare optical fibers 5 is stopped by the connection end face 3 of the multiple-core optical connector 4 being brought into contact with the groove-formed surface 37 of the tape support member 18. Hereupon, a roughing state of the multiple-core optical connector 4 is completed.

When the roughing is finished, the bare optical fibers 5 will have only a dimension $L_2$ from the connection end faces 3 of the ferrule 1, that is, a length protruding 5 $\mu$m therefrom.

Next, after removing the pay-out roller 30 and winding roller 31 of the coarse-grained abrasive tape 35 from the pay-out shaft 27 and the winding shaft 28, the pay-out roller 30 and winding roller 31 of a fine-grained abrasive tape 36 are attached to the pay-out shaft 27 and winding shaft 28 corresponding thereto, and as in a case of roughing, the leading end of the fine-grained abrasive tape 36 is caused to pass through the guide roller 33a, tape travelling groove 20 and guide roller 33b in this order and is wound onto the winding roller 31. Similarly, by causing the fine-grained abrasive tape 36 to travel through the tape travelling groove 20, the end faces of the bare optical fibers 5 of the multiple-core optical connector 3 are polished for finishing.

When starting this finishing, since the fine-grained abrasive tape 36 is thicker than the coarse-grained tape 35, the connection end face 3 of the ferrule 1 is kept apart from the groove-formed surface 37 of the tape travelling groove 20, wherein the finishing is started in the same polishing state as that of the abovementioned roughing, the finishing is continued until an appointed duration of time elapses, and the finishing is completed when the time elapses. According to experiments made by the present inventor, it is confirmed that good quality end faces of optical fibers can be obtained by continuing the finishing for one to four minutes. Therefore, the finishing is terminated after the finishing is continued by the fine-grained abrasive tape 36 for one to four minutes.

Furthermore, it is preferable in view of increasing the quality of the polishing that the tape travelling rate of the polishing tape 32 (coarse-grained abrasive tape 35 and fine-grained abrasive tape 36) is set to 0.02 to 0.08 meters per second. In this preferred embodiment, the polishing tape is caused to travel at a travelling rate in this range.

The multiple-core optical connector 4, the polishing of which is completed, is removed from the collet chuck 15, and a multiple-core optical connector 4 which is the next subject to be polished is mounted in the collet chuck 15. As in the above description, multiple-core optical connectors 4 are polished one after another by using a coarse-grained abrasive tape 35 and a fine-grained abrasive tape 36.

Upon the completion of the finishing, the length of the bare optical fibers 5 protruding from the connection end face 3 will be 2 $\mu$m or the like. That is, it is highly recommended that the finishing is carried out so that the fiber protrusion length is in this range.

In the preferred embodiment, a method by which the end face of bare optical fibers 5 and the connection end face 3 of the ferrule 1 are polished altogether as in prior arts is not employed, but a system in which only the end face of the bare optical fibers 5 protruding from the connection end face 3 of the multiple-core connector 4 is polished is employed. Therefore, it is possible to remarkably decrease the polishing pressure required for polishing in comparison with the conventional examples. By lightening this load, it is not necessary to prepare large-sized equipment construction in which a grinding wheel 41 is used on the turntable 40 as in the conventional examples. Since it is possible to carry out good quality polishing by causing the polishing tape 32 to travel, the equipment construction can be remarkably simplified, and it is possible to construct the machine as a micro machine, the size of which is very small-sized and the weight of which is much decreased. Therefore, it is easy to convey the polishing machine to a site of connection of multiple-core optical connectors and it is possible to remarkably improve the working efficiency of connections of multiple-core optical connectors.

Furthermore, according to the preferred embodiment, as described above, since the polishing pressure required for polishing is remarkably decreased in comparison with the prior arts, it is possible to polish the end faces of bare optical fibers 5 of a multiple-core optical connector 4 in a short time by only an easy operation of causing the polishing tape 32 to run along the tape travelling plane 9, and further it is possible to polish the end face of the multiple-core optical connector 4 in a high quality without damaging or cracking the end faces of the bare optical fibers 5. In the preferred embodiment, since the tape travelling plane 9 of the tape support member 18 is formed to be a desired end face shape (flat plane) of bare optical fibers 5, the flat plane is made wider than the end face of the bare optical fibers 5, and the end faces of the bare optical fibers 5 are polished by a polishing tape 32 which is caused to travel along the tape travelling plane 9, it is possible to securely polish the end faces of each bare optical fiber 5 to be a flat plane.

Furthermore, the invention is not limited to the abovementioned preferred embodiment. Various modifications and variations are possible. For example, Although in the abovementioned preferred embodiment a multiple-core optical connector 4 is polished by using a coarse-grained abrasive tape 35 and a fine-grained abrasive tape 36, for example, the fine-grained abrasive tape can be divided into further a plurality of stages according to the sizes of abrasive grains, and the polishing tape may be constructed so as to enable further minute finishing by using finer-grained abrasive tapes for the respective stages. As a matter of course, the coarse-grained abrasive tape can be divided into a plurality of stages according to the sizes of abrasive grains, wherein it is possible to carry out a polishing by using a polishing tape which consists of several tapes from coarse abrasives to fine abrasives.

Furthermore, in the abovementioned preferred embodiment, although the coarse-grained abrasive tape 35 and fine-grained abrasive tape 36 are wound onto separate and independent rollers 30 and 31, for example, a the leading end of the fine-grained tape 36 may be connected to the terminal end of the coarse-grained tape 35 and may be composed as one tape in which a coarse-grained tape and a fine-grained tape are linked with each other, wherein the same may be wound on a pair of a pay-out roller 30 and a winding roller 31. Thus, if a coarse-grained abrasive tape and a fine-grained abrasive tape are made one continuous tape, it is possible to eliminate a cumbersome work which is replacement of polishing tapes required whenever a roughing polish or a finishing polish is performed. If such a tape is utilized, for example, a fine-grained abrasive tape is divided into a plurality of stages according to the sizes of grains and the coarse-grained abrasive tape is also divided into a plurality of stages according to the sizes of grains. A much finer grained abrasive tape is connected to the terminal end of a coarse-grained abrasive tape one after another, making one polishing tape, the most coarse-grained abrasive tape of this polishing tape is applied first and subsequently progressively finer-grained abrasive tapes are applied one after another, whereby it is possible to polish minute multiple-core optical connectors by causing such a composite polishing tape to travel.

Still furthermore, in the abovementioned preferred embodiment, although an independent type pay-out roller 30 and a winding roller 31, both of which wind a polishing tape, are fitted to and attached to the pay-out shaft 27 and winding shaft 28 directly corresponding thereto, the pay-out roller 30 and winding roller 31 are accommodated in a cassette in a state that a polishing tape is wound at the pay-out roller 30 side and the cassette is fitted to and attached to the pay-out shaft 27 and winding shaft 28, whereby it is possible to construct a polishing tape in a pattern of a cassette type polishing tape just like a cassette tape used in a so-called tape recorder. In this case, a cassette in which only a coarse-grained abrasive tape is accommodated and a cassette in which only a fine-grained abrasive tape is accommodated are separately formed, and these cassettes may be changed for polishing in cases of roughing and finishing. Still furthermore, a continuous polishing tape consisting of a coarse-grained abrasive tape and a fine-grained abrasive tape is accommodated in a cassette, and by one cassette it is possible to carry out a polishing continuously from roughing to finishing.

Furthermore, in the abovementioned preferred embodiment, although, when carrying out finishing, the finishing will be terminated after a predetermined duration of time (setting time from one to four minutes) elapses from the time of starting, the time of terminating the finishing is not by the elapse time from the time of starting the finishing but may be set by the travelling length of the fine-grained abrasive tape 36. In this case, for example, a counter showing the tape travelling distance is provided, and the travelling of the fine-grained abrasive tape may be stopped when the counter reaches a certain set count value, or it is possible that the tape length of the fine-grained abrasive tape is set in advance to a length necessary for the finishing, and the finishing will be terminated when the fine-grained abrasive tape is completely paid out to the end part.

Still furthermore, in the abovementioned preferred embodiment, the grains (abrasives) of a polishing tape 32 are made of aluminum oxide. However, a polishing tape made of chrome oxide or other abrasives may be used, and if the optimal polishing conditions are established in compliance with the kind of a polishing tape to be used and the polishing is carried out according to the established polishing conditions, a good quality of fiber end face polishing can be secured as in the above preferred embodiment.

Furthermore, in the abovementioned preferred embodiment, a polishing tape 32 is composed of a combination of a coarse-grained abrasive tape 35 and a fine-grained abrasive tape 36, wherein a finishing is carried out by a fine-grained abrasive tape 36 after a roughing is performed by a coarse-grained abrasive tape 35. However, the polishing tape 32 is not limited to a combination of a coarse-grained abrasive tape 35 and a fine-grained abrasive tape 36, but it may be composed of any adequate tape. Actually however, as in the abovementioned preferred embodiment, if a coarse-grained abrasive tape 35 and a fine-grained abrasive tape 36 are combined, and a finishing is carried out by a fine-grained abrasive tape 36 after a roughing is performed by a coarse-grained abrasive tape 35, it is possible to very efficiently polish the end faces of bare optical fibers 5 in a good state.

Figure 6A:
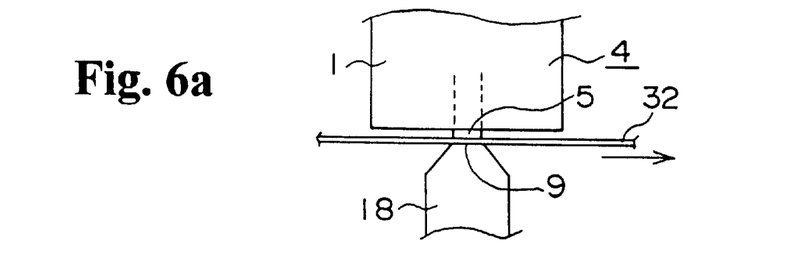
FIG. 6a is an explanatory view of a tape support member for flat plane forming optical fiber end faces, which is used in another preferred embodiment of a polishing machine according to the invention.
Figure 6B:
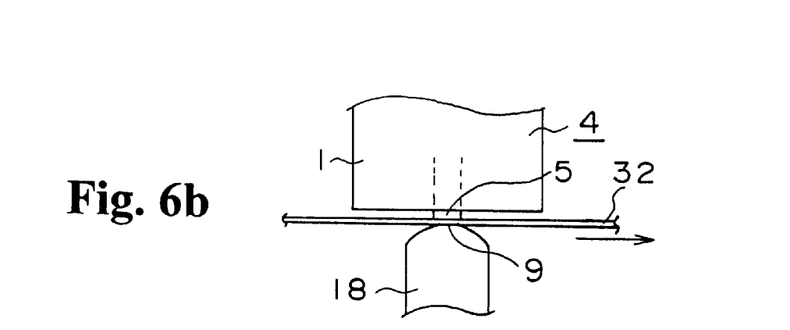
FIG. 6b is an alternative embodiment of a tape support member for flat plane forming optical fiber end faces.
Figure 6C:
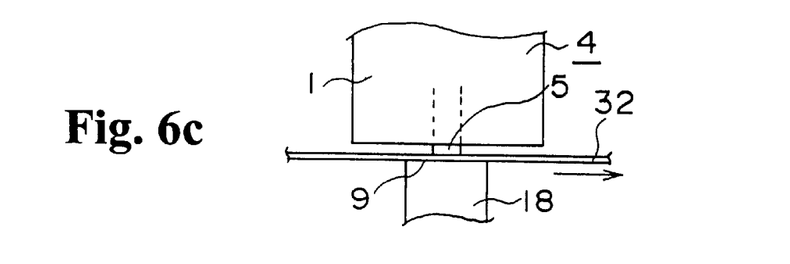
FIG. 6c is a further alternative embodiment of a tape support member for flat plane forming optical fiber end faces.
Figure 7:
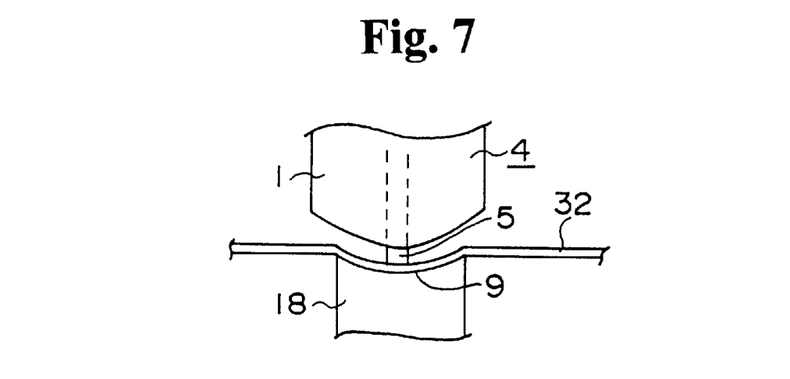
FIG. 7 is an explanatory view of a tape support member for forming a convex-shaped optical fiber end faces, which is used in another preferred embodiment of a polishing machine according to the invention.
Figure 8A:
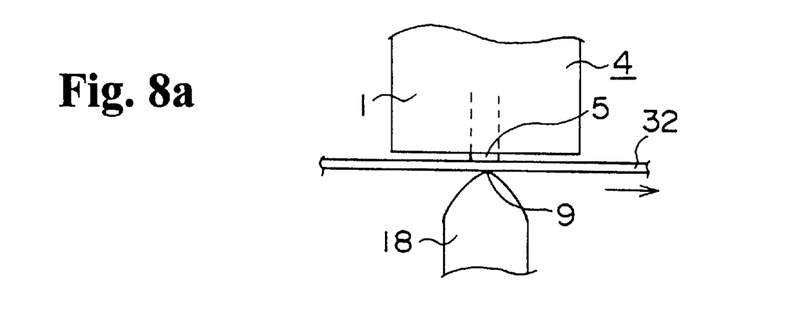
FIG. 8a is an explanatory view of a tape backup member for forming a concave-shaped optical fiber end faces, which is used in another preferred embodiment of a polishing machine according to the invention.
Figure 8B:
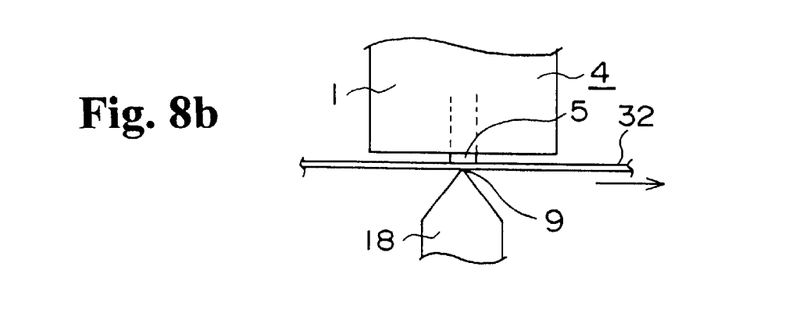
FIG. 8b is an alternative embodiment of a tape support member for forming concave-shaped optical fiber end faces.
Figure 8C:
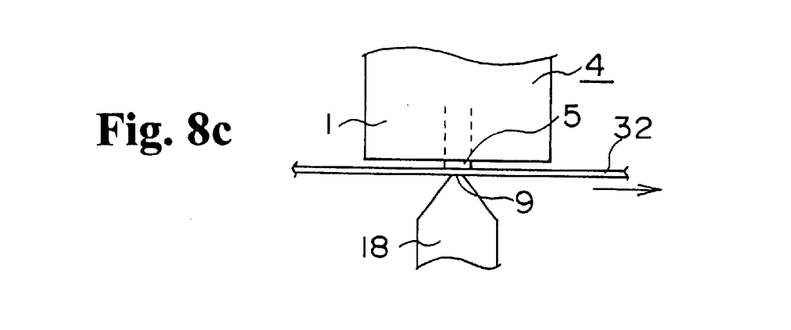
FIG. 8c is a further alternative embodiment of a tape support member for forming concave-shaped optical fiber end faces.

Furthermore, in the abovementioned preferred embodiment, although the tape travelling plane 9 is formed on the bottom of the tape travelling groove 20 of the tape support member 18, the tape travelling plane 9 is not necessarily formed in the tape travelling groove 20, for example, the tape backup member 18 may be a trapezoidal member shown in FIG. 6 through FIG. 8, and the tape travelling plane 9 may be formed on the surface of the trapezoid. Furthermore, when the tape travelling plane 9 is formed on a trapezoidal tape support member 18 as shown in FIG. 6 through FIG. 8, the size, shape of the tape support member 18 and the size, shape of the tape travelling plane 9 are not particularly limited in a case where the tape travelling plane 9 is formed in the tape travelling groove 20 as in the abovementioned preferred embodiment.

For example, when polishing the end faces of bare optical fibers 5 of a multiple-core optical connector 4, etc., is polished to be flat, as shown in FIGS. 6(*a*) to (*c*), the tape travelling plane 9 may be a plane having a wider flat plane than the end faces of the optical fibers to be polished by a polishing tape 32 which is caused to travel along the tape travelling plane 9. Furthermore, when polishing the end faces of optical fibers to be spherically convex, as shown in FIG. 7, the tape travelling plane 9 may be formed to be concave. Furthermore, when polishing the end faces of optical fibers to be concave, as shown in FIGS. 8(*a*) and (*b*), the tape travelling plane 9 may be formed to be convex, and as shown in FIG. 8(*c*), the tape travelling plane 9 may be a flat plane which is narrower than the end faces of optical fibers.

Furthermore, in the abovementioned preferred embodiment, the center axis of a multiple-core optical connector 4 in the lengthwise direction is made the same direction of the center axis of the collet chuck in its lengthwise direction, that is, the multiple-core optical connector 4 is attached so as to make the connection end face 3 thereof orthogonal to the center axis of the collet chuck 15 in its lengthwise direction, wherein the end faces of the respective bare optical fibers 5 are polished to become parallel to the connection end face 3 of the ferrule 1. However, the tip end face of the respective bare optical fibers 5 may be polished to be diagonal with respect to the connection end face 3 of the ferrule 1 (the plane inclined in the thickness direction of the connection end face, that is, the plane inclined in the direction orthogonal to the transverse direction of the aligned bare optical fibers 5). In this case, if the collet chuck 15 is diagonally attached to the holding frame portion 10, the axial direction of optical fibers is made diagonal to the travelling direction of the polishing tape, and it is possible to diagonally polish the optical fiber end faces with respect to the optical axis.

Figure 9:
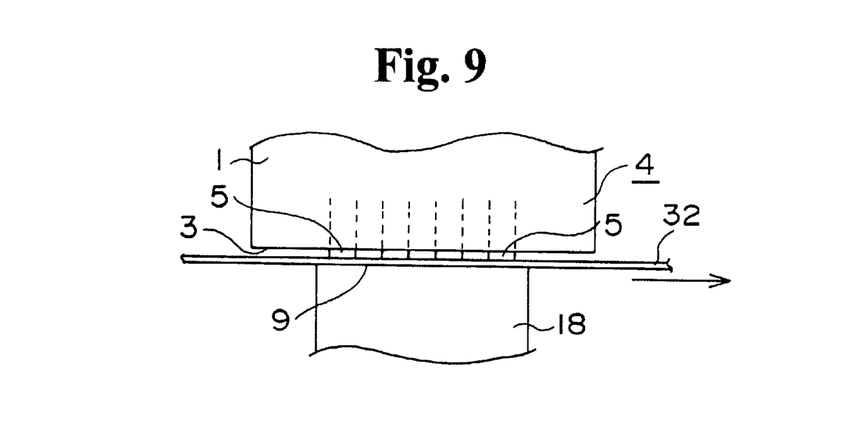
FIG. 9 is an explanatory view showing an example of a polishing method for polishing optical fibers by causing a polishing tape to travel in the same direction as the aligned optical fibers of a multiple-core optical connector, using a method for polishing optical connector end faces according to the invention.

Furthermore, although, in the abovementioned preferred embodiment, the polishing tape 32 is caused to travel in the direction roughly orthogonal to the transverse alignment of the optical fibers of a multiple-core optical connector 4 in order to polish the end faces of bare optical fibers 5, for example, as shown in FIG. 9, the polishing tape 32 may be caused to travel in parallel to the direction of the alligned bare optical fibers 5 of the multiple-core optical connector 4 in order to polish the end faces of bare optical fibers 5. However, as in the preferred embodiment, by causing the polishing tape 32 to travel in a direction roughly orthogonal to the transverse alignment direction of the multiple-core optical connector 4, it becomes easier to adjust the parallelism between the connection end face 3 of the multiple-core optical connector 4 and the tape travelling plane 9, and it is possible to true up the end faces of a plurality of bare optical fibers 5 reliably.

Still furthermore, although, in the preferred embodiment, a multiple-core optical connector 4 is set in a polishing machine to ensure that a plurality of bare optical fibers 5 of the multiple-core optical connector 4 are thoroughly polished, optical connectors set in the polishing machine are not necessarily limited to a multiple-core optical connector 4 composed of a plurality of optical fibers juxtaposed. The same may be a single-core optical connector in which a single optical fiber is provided.

INDUSTRIAL FEASIBILITY

As described above, a method for polishing optical connector end faces and a machine for doing the same according to the invention is suitable for polishing, under a light load, the end faces of optical fibers protruding from the connection end faces of an optical connector.

What is claimed is:

1. A method for polishing optical connector end faces comprising the following steps:

positioning an optical connector, in which an optical fiber protrudes from the connector end face thereof, in a polishing machine, arranging a polishing tape having flexibility at the side opposite the connector end face of an optical connector and bringing the end face of the optical fiber into engagement with a polishing abrasive face of the polishing tape, and arranging a tape support member provided with a tape travelling plane of a shape corresponding to an appointed end face shape of the optical fiber against an opposite surface of the polishing abrasive surface of the polishing tape, and causing the polishing tape to travel between the tape travelling plane of the tape support member and the optical fiber end face, wherein the tape travelling plane is formed to be a recessed plane, the width of the recessed plane being narrower than that of the connector end face of the optical connector, and the depth of the recessed plane being greater than a thickness of a coarse-grained abrasive polishing tape caused to travel at the commencement of polishing the optical fiber end face.

2. A method for polishing optical connector end faces as set forth in claim 1, wherein said optical connector is a multiple-core optical connector in which a plurality of optical fibers are aligned in substantially a single plane.

3. A method for polishing optical connector end faces as set forth in claim 2, wherein a polishing tape is caused to travel roughly orthogonally to the transverse direction of the aligned optical fibers of said multiple-core optical connector.

4. A method for polishing optical connector end faces comprising the steps of:

positioning an optical connector, in which an optical fiber protrudes from the connector end face thereof, in a polishing machine, arranging a polishing tape having flexibility at the side opposite the connector end face of an optical connector and bringing the end face of the optical fiber into engagement with a polishing abrasive face of the polishing tape, and arranging a tape support member with a tape travelling plane of a shape corresponding to an appointed end face shape of the optical fiber against an opposite surface of the polishing abrasive surface of the polishing tape, and causing the polishing tape to travel between the tape travelling plane of the tape support member and the optical fiber end face, wherein said tape supporting member includes a groove, narrower than a full width of a connector, in which the tape travelling plane is formed; and said optical connector is a multiple-core optical connector in which a plurality of optical fibers are juxtaposed to each other.

5. A machine for polishing optical connector end faces comprises:

an optical connector attaching portion for attaching an optical connector in which one or more optical fibers protrude from the connector end face, a tape support member provided with a tape travelling plane shaped so as to correspond with an appointed end face shape of the optical fibers and positioned facing the connector end face of optical connectors to be attached to the optical connector attaching portion, a polishing tape which has an abrasive polishing surface thereon and travels along the tape travelling plane of the tape support member with the polishing surface positioned against the optical fiber end face, a tape travelling drive means for carrying out a travelling drive of the polishing tape, which is advanced from a pay-out shaft onto a winding shaft via the tape travelling plane, and a polishing pressure applying means for giving polishing pressure for a polishing tape to the optical fiber end faces by pressing at least one of the tape travelling plane side and the optical connector side, both of which are opposite each other, to the other thereof wherein said tape supporting member includes a groove, narrower than a full width of a connector, in which the tape travelling plane is formed.

6. A machine for polishing optical connector end faces as set forth in claim 5, wherein the tape travelling plane of said tape support member has a wider flat plane than the optical fiber end faces.

7. A machine for polishing optical connector end faces comprises:

an optical connector attaching portion for attaching an optical connector in which one or more optical fibers protrude from the connector end face, a tape support member provided with a tape travelling plane shaped so as to correspond with an appointed end face shape of the optical fibers and positioned facing the connector end face of optical connectors to be attached to the optical connector attaching portion, a polishing tape which has an abrasive polishing surface thereon and travels along the tape travelling plane of the tape support member with the polishing surface positioned against the optical fiber end face, a tape travelling drive means for carrying out a travelling drive of the polishing tape, which is advanced from a pay-out shaft onto a winding shaft via the tape travelling plane, a polishing pressure applying means for giving polishing pressure for a polishing tape to the optical fiber end faces by pressing at least one of the tape travelling plane side and the optical connector side, both of which are opposite each other, to the other thereof, wherein said tape supporting member includes a groove, narrower than a full width of a connector, in which the tape travelling plane is formed, and wherein the tape travelling plane of said tape support member is formed to be concave.

8. A machine for polishing optical connector end faces comprises:

an optical connector attaching portion for attaching an optical connector in which one or more optical fibers protrude from the connector end face, a tape support member provided with a tape travelling plane shaped so as to correspond with an appointed end face shape of the optical fibers and positioned facing the connector end face of optical connectors to be attached to the optical connector attaching portion, a polishing tape which has an abrasive polishing surface thereon and travels along the tape travelling plane of the tape support member with the polishing surface positioned against the optical fiber end face, a tape travelling drive means for carrying out a travelling drive of the polishing tape, which is advanced from a pay-out shaft onto a winding shaft via the tape travelling plane, a polishing pressure applying means for giving polishing pressure for a polishing tape to the optical fiber end faces by pressing at least one of the tape travelling plane side and the optical connector side, both of which are opposite each other, to the other thereof, wherein said tape supporting member includes a groove, narrower than a full width of a connector, in which the tape travelling plane is formed, and wherein the tape travelling plane of said tape support member is formed to be convex.

9. A machine for polishing optical connector end faces comprises:

an optical connector attaching portion for attaching an optical connector in which one or more optical fibers protrude from the connector end face, a tape support member provided with a tape travelling plane shaped so as to correspond with an appointed end face shape of the optical fibers and positioned facing the connector end face of optical connectors to be attached to the optical connector attaching portion, a polishing tape which has an abrasive polishing surface thereon and travels along the tape travelling plane of the tape support member with the polishing surface positioned against the optical fiber end face, a tape travelling drive means for carrying out a travelling drive of the polishing tape, which is advanced from a pay-out shaft onto a winding shaft via the tape travelling plane, a polishing pressure applying means for giving polishing pressure for a polishing tape to the optical fiber end faces by pressing at least one of the tape travelling plane side and the optical connector side, both of which are opposite each other, to the other thereof, wherein said tape supporting member includes a groove, narrower than a full width of a connector, in which the tape travelling plane is formed, and wherein said polishing tape is constructed of a continuous tape in which a thicker fine-grained abrasive tape is linked to a coarse-grained abrasive tape at the terminal end thereof.

10. A machine for polishing optical connector end faces as set forth in claim 9, wherein a polishing tape is a cassette type polishing tape in which the same is mounted between a pay-out roller attached to the pay-out shaft and a winding roller attached to the winding shaft, and said pay-out roller and winding roller are incorporated in a cassette.

11. A machine for polishing optical connector end faces comprises: an optical connector attaching portion for attaching an optical connector in which one or more optical fibers protrude from the connector end face, a tape support member provided with a tape travelling plane shaped so as to correspond with an appointed end face shape of the optical fibers and positioned facing the connector end face of optical connectors to be attached to the optical connector attaching portion, a polishing tape which has an abrasive polishing surface thereon and travels along the tape travelling plane of the tape support member with the polishing surface positioned against the optical fiber end face, a tape travelling drive means for carrying out a travelling drive of the polishing tape, which is advanced from a pay-out shaft onto a winding shaft via the tape travelling plane, a polishing pressure applying means for giving polishing pressure for a polishing tape to the optical fiber end faces by pressing at least one of the tape travelling plane side and the optical connector side, both of which are opposite each other, to the other thereof, wherein said tape supporting member includes a groove, narrower than a full width of a connector, in which the tape travelling plane is formed, and wherein a coarse-grained abrasive tape and a thicker fine-grained abrasive tape are prepared as separate and independent polishing tapes, and said coarse-grained abrasive tape and fine-grained abrasive tape are adapted for mounting between a pay-out shaft and a winding shaft so as to be freely replaced.

12. A machine for polishing optical connector end faces as set forth in claim 11, wherein a polishing tape is a cassette type polishing tape in which the same is mounted between a pay-out roller attached to the pay-out shaft and a winding roller attached to the winding shaft, and said pay-out roller and winding roller are incorporated in a cassette.

13. A machine for polishing optical connector end faces comprises:

an optical connector attaching portion for attaching an optical connector in which one or more optical fibers protrude from the connector end face, a tape support member provided with a tape travelling plane shaped so as to correspond with an appointed end face shape of the optical fibers and positioned facing the connector end face of optical connectors to be attached to the optical connector attaching portion, a polishing tape which has an abrasive polishing surface thereon and travels along the tape travelling plane of the tape support member with the polishing surface positioned against the optical fiber end face, a tape travelling drive means for carrying out a travelling drive of the polishing tape, which is advanced from a pay-out shaft onto a winding shaft via the tape travelling plane, a polishing pressure applying means for giving polishing pressure for a polishing tape to the optical fiber end faces by pressing at least one of the tape travelling plane side and the optical connector side, both of which are opposite each other, to the other thereof, wherein said tape supporting member includes a groove, narrower than a full width of a connector, in which the tape travelling plane is formed, and wherein a polishing coolant supplying means is provided for supplying a polishing coolant to an area where said optical fiber end faces are pressed to and are brought into contact with the polishing surface of a polishing tape and are polished thereat.

14. A machine for polishing optical connector end faces comprises: an optical connector attaching portion for attaching an optical connector in which one or more optical fibers protrude from the connector end face, a tape support member provided with a tape travelling plane shaped so as to correspond with an appointed end face shape of the optical fibers and positioned facing the connector end face of optical connectors to be attached to the optical connector attaching portion, a polishing tape which has an abrasive polishing surface thereon and travels along the tape travelling plane of the tape support member with the polishing surface positioned against the optical fiber end face, a tape travelling drive means for carrying out a travelling drive of the polishing tape, which is advanced from a pay-out shaft onto a winding shaft via the tape travelling plane, a polishing pressure applying means for giving polishing pressure for a polishing tape to the optical fiber end faces by pressing at least one of the tape travelling plane side and the optical connector side, both of which are opposite each other, to the other thereof, wherein said tape supporting member includes a groove, narrower than a full width of a connector, in which the tape travelling plane is formed, and wherein an optical connector is detachably attached to a collet chuck and said collet chuck is detachably attached to the connector attaching portion.

15. A machine for polishing an end face of at least one optical fiber which projects from an optical connector comprising:

a length of polishing tape having an abrasive surface thereon;

drive means for advancing the polishing tape in a linear path;

a tape support member having a tape travelling plane shaped so as to correspond with an appointed end face shape of the optical fiber provided on the linear path of the polishing tape;

attaching means for securing an optical connector in the machine with the end face of the optical fiber facing the tape travelling plane; and means for contacting the end face of the optical fiber at a polishing pressure against the abrasive surface of the polishing tape adjacent the tape travelling plane, wherein said tape supporting member includes a groove, narrower than a full width of a connector, in which the tape travelling plane is formed.

16. A machine for polishing an end face of at least one optical fiber which projects from an optical connector as set forth in claim 15, wherein said means for contacting the end face of the optical fiber includes selectively adjustable means for applying polishing pressure.

17. A machine for polishing an end face of at least one optical fiber which projects from an optical connector as set forth in claim 15, further including timing means for determining when sufficient polishing has occurred.

18. A machine for polishing an end face of at least one optical fiber which projects from an optical connector comprising:

a length of polishing tape having an abrasive surface thereon;

drive means for advancing the polishing tape in a linear path;

a tape support member having a tape travelling plane shaped so as to correspond with an appointed end face shape of the optical fiber provided on the linear path of the polishing tape;

attaching means for securing an optical connector in the machine with the end face of the optical fiber facing the tape travelling plane; and means for contacting the end face of the optical fiber at a polishing pressure against the abrasive surface of the polishing tape adjacent the tape travelling plane, wherein said tape supporting member includes a groove, narrower than a full width of a connector, in which the tape travelling plane is formed, and wherein the abrasive polishing surface includes a plurality of stages each having a progressively decreasing abrasive coarseness.

19. A machine for polishing an end face of at least one optical fiber which projects from an optical connector as set forth in claim 18, wherein the thickness of the tape increases as the coarseness of the abrasive surface decreases.

20. A machine for polishing an end face of at least one optical fiber which projects from an optical connector as set forth in claim 19, wherein the tape supporting member includes a groove, narrower than a full width of a connector, in which the tape travelling plane is formed, whereby an end face of the connector is spaced from the abrasive polishing surface.

21. A machine for polishing an end face of at least one optical fiber which projects from an optical connector as set forth in claim 20, wherein the finest-grain abrasive tape has a thickness equal to or greater than the depth of the groove.

* * * * *

UNITED STATES PATENT AND TRADEMARK OFFICE
CERTIFICATE OF CORRECTION

PATENT NO.    : 6,309,278 B1           Page 1 of 1
DATED         : October 30, 2001
INVENTOR(S)   : Suzuki et al.

It is certified that error appears in the above-identified patent and that said Letters Patent is hereby corrected as shown below:

<u>Title page,</u>
Item [86], PCT No.: should read:
-- PCT filed:    Feb. 24, 1997
   PCT No.:     PCT/JP97/00516 --.

Signed and Sealed this

Tenth Day of September, 2002

Attest:

JAMES E. ROGAN
Attesting Officer    Director of the United States Patent and Trademark Office